United States Patent
Miyahisa et al.

(10) Patent No.: US 7,806,943 B2
(45) Date of Patent: Oct. 5, 2010

(54) SECONDARY BATTERY AND METHOD FOR PRODUCING THE SAME

(75) Inventors: Masaharu Miyahisa, Osaka (JP); Yoshiki Ohsawa, Osaka (JP); Hideyuki Kumakiri, Osaka (JP); Seiichi Kato, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/598,878

(22) PCT Filed: Jul. 16, 2008

(86) PCT No.: PCT/JP2008/001909
§ 371 (c)(1), (2), (4) Date: Nov. 4, 2009

(87) PCT Pub. No.: WO2009/011123
PCT Pub. Date: Jan. 22, 2009

(65) Prior Publication Data
US 2010/0136394 A1    Jun. 3, 2010

(30) Foreign Application Priority Data
Jul. 17, 2007 (JP) ............................. 2007-185812
Jul. 16, 2008 (JP) ............................. 2008-184556

(51) Int. Cl.
*H01M 4/82* (2006.01)
*H01M 4/02* (2006.01)
*H01M 4/00* (2006.01)
*H01M 6/10* (2006.01)

(52) U.S. Cl. .................... 29/623.5; 29/623.1; 29/623.3; 429/209; 429/94

(58) Field of Classification Search .................. 429/94, 429/122, 129, 143, 209, 246; 29/623.1, 623.3, 29/623.5; 118/56, 600, 620, 624
See application file for complete search history.

(56) References Cited

U.S. PATENT DOCUMENTS

| | | |
|---|---|---|
| 2005/0053833 A1 | 3/2005 | Hayashida et al. |
| 2006/0051669 A1 | 3/2006 | Hayashida et al. |

(Continued)

FOREIGN PATENT DOCUMENTS

JP    07-220759    8/1995

(Continued)

*Primary Examiner*—Dah-Wei D Yuan
*Assistant Examiner*—Claire L Rademaker
(74) *Attorney, Agent, or Firm*—McDermott Will & Emery LLP

(57) ABSTRACT

A secondary battery includes an electrode plate group (1) in which a positive electrode plate (2) and a negative electrode plate (3) are wound or stacked with a separator (4) interposed therebetween and a battery case (7) in which the electrode plate group (1) and an electrolyte are contained. At least one of the positive electrode plate (2) and the negative electrode plate (3) includes a porous protective film (28) formed on a surface of an active material layer. In a surface of the at least one of the electrode plates on which the porous protective film (28) is provided, a plurality of grooves (10) are formed, and the grooves (10) are also formed in the surface of the active material so that each of the grooves (10) extends from the surface of the porous protective film (28) to the surface of the active material layer.

9 Claims, 5 Drawing Sheets

U.S. PATENT DOCUMENTS

| | | |
|---|---|---|
| 2006/0194116 A1 | 8/2006 | Suzuki et al. |
| 2006/0281007 A1 | 12/2006 | Tsutsumi et al. |
| 2007/0122715 A1 | 5/2007 | Fujino et al. |
| 2007/0231468 A1* | 10/2007 | Hayashi ........................ 427/77 |
| 2009/0092742 A1 | 4/2009 | Teramoto et al. |

FOREIGN PATENT DOCUMENTS

| | | |
|---|---|---|
| JP | 09-298057 | 11/1997 |
| JP | 11-154508 | 6/1999 |
| JP | 2001-176558 | 6/2001 |
| JP | 2002-015764 | 1/2002 |
| JP | 2003-168421 | 6/2003 |
| JP | 2004-6275 | 1/2004 |
| JP | 2006-107853 | 4/2006 |
| JP | 2007-103356 | 4/2007 |
| JP | 2007-117973 | 5/2007 |
| WO | WO 2005/029614 A1 | 3/2005 |
| WO | WO 2005/067080 A1 | 7/2005 |
| WO | WO 2005/117167 A1 | 12/2005 |

* cited by examiner

SECONDARY BATTERY AND METHOD FOR PRODUCING THE SAME

RELATED APPLICATIONS

This application is the U.S. National Phase under 35 U.S.C. §371 of International Application No. PCT/JP2008/001909, filed on Jul. 16, 2008, which in turn claims the benefit of Japanese Application Nos. 2007-185812, filed on Jul. 17, 2007, and 2008-184556, filed on Jul. 16, 2008, the disclosures of which Applications are incorporated by reference herein.

TECHNICAL FIELD

The disclosure of the present invention relates to a secondary battery such as a lithium secondary battery which can be produced with high productivity and also can achieve increased safety with which the occurrence of an internal short-circuit and the like can be effectively prevented.

BACKGROUND ART

In recent years, lithium secondary batteries which have grown in use as power supplies for driving portable electronic devices, communication devices, and the like are configured as secondary batteries with a high potential and a high discharge capacity by using a carbonaceous material capable of inserting and extracting lithium for a negative electrode plate and, composite oxide such as $LiCoO_2$ or the like of transition metal and lithium for an active material of a positive electrode plate. However, with recent increase in function of electronic devices and communication devices, increased demands have been placed on the safety of battery while the capacity of lithium secondary batteries is further increased.

When an external physical impact is added to a lithium secondary battery by error for some reason, or when a lithium secondary battery is charged with an excessively large current, damage to a separator in the battery and the like might be caused to bring a positive electrode plate and a negative electrode plate in contact with each other, and thus an internal short-circuit might occur. When such an internal short-circuit occurs, a current flows intensively at short-circuited part and, as a result, heat is generated. If a large amount of heat is generated due to the internal short-circuit, materials forming the positive electrode and the negative electrode might be decomposed, an electrolyte might be caused to boil, and gas might be generated due to the decomposition of materials forming the positive electrode and the negative electrode. Thus, an internal short-circuit is considered as a factor for rapid heat generation in a battery.

To cope with this, a lithium secondary battery (see Patent Document 1) in which a porous protective film is formed on one of respective surfaces of a negative electrode active material layer and a positive electrode active material layer to ensure the safety of the battery has been proposed. Also, a lithium secondary battery (see Patent Document 2) in which a porous protective film formed of an inorganic filler (an inorganic insulation material) and a binder is attached to a surface of a negative electrode plate to suppress the occurrence of an internal short-circuit and which is provided with excellent heat resistance and thus exhibits improved safety has been proposed.

As a method for increasing a battery capacity, a method in which for each of a positive electrode plate and a negative electrode plate, a mixture paste which is a coating material obtained by mixing constituent materials is applied to a current collector core material and is dried and then a layer of the mixture paste is compressed by roll pressing to a predetermined thickness has been employed. However, as in this method, when a filling density of an active material in each of the electrode plates is increased, a porosity in each of the electrode plates is reduced and it becomes difficult to impregnate of an electrolyte in each of the electrode plates. Accordingly, impregnation of the electrolyte into an electrode plate group is dramatically reduced, thus resulting in undesirable nonuniform distribution of the electrolyte in the electrode plate group.

As an approach to solve the above-described problem, it has been proposed to form electrolyte guiding grooves each of which is formed so as to be concaved in an impregnation direction of electrolyte in an entire surface of a negative electrode active material layer (see Patent Document 3). Also, a nonaqueous electrolyte battery in which groove-like concave portions are provided in a surface of an active material layer in a positive electrode plate or a negative electrode plate to facilitate impregnation of an electrolyte into the electrode plate through the concave portions has been proposed (see Patent Document 4).

Patent Reference 1: Japanese Published Application No. H07-220759
Patent Reference 2: International publication WO 2005/029614
Patent Reference 3: Japanese Published Application No. H09-298057
Patent Reference 4: Japanese Published Application No. H11-154508

DISCLOSURE OF THE INVENTION

Problems Which the Invention is to Solve

The lithium secondary battery of Patent Document 1 is formed so that, in the step of forming an electrode plate, when an electrode plate hoop material before being cut into individual electrode plates is conveyed, fall-off of an active material from an active material layer due to the active material layer of the electrode plate hoop material being brought in contact with a guide roller or the like is suppressed by a porous protective film. Also, in the lithium secondary battery of Patent Document 2, a porous protective film is provided so as to be attached to a surface of a negative electrode plate for the purpose of suppressing the generation of an internal short-circuit and ensuring heat resistance. Although both of the lithium secondary batteries can achieve at least the effect of ensuring safety, as described above, consideration has not been given in improving electrolyte injection property and impregnation of an electrolyte into an electrode plate. Therefore, improvement in productivity by reducing an electrolyte injection time can not be achieved.

According to a technique disclosed in Patent Document 3, a large number of electrolyte guiding grooves are formed in a belt-like negative electrode plate, except for both end parts of the negative electrode plate in a widthwise direction of the negative electrode plate, so that an electrolyte can be impregnated at part in which the electrolyte guiding grooves are formed, but the effect of facilitating injection of the electrolyte into an electrode plate group is not sufficient. Moreover, in Patent Document 4, electrolyte injection property is improved by the presence of the groove-like concave portions. Also, in Patent Document 4, since at least part of a center line of each of the groove-like concave portions is tilted with respect to a center line of the electrode plate group having a spirally wound structure, the direction in which the center line of the groove-like concave portions extend differs from the direction in which a positive electrode plate, a negative electrode plate and a separator tend to be fractured due to tensile force, so that concentration of stress can be suppressed and fractures of the positive electrode plate, the negative electrode plate and the separator can be prevented. That is, each of the techniques of Patent Documents 3 and 4 can achieve at least a certain effect in terms of improvement of the electrolyte injection property or impregnation of the electrolyte into the electrode plate group, but no consideration is given in ensuring safety of the battery such as preventing the generation of an internal short-circuit in a battery and the like.

In view of the above-described known problems, the present disclosure has been devised and it is therefore an object of the present disclosure to provide a battery which allows improvement of an electrolyte injection property and impregnation in the electrolyte injection step resulting in high yield production of the secondary battery, and also can achieve safety with which the occurrence of an internal short-circuit and the like can be effectively prevented, and a method for producing the secondary battery.

Solution to the Problems

Each of first and second secondary batteries according to the present disclosure includes an electrode plate group in which a positive electrode plate and a negative electrode plate are wound or stacked with a separator interposed therebetween and a battery case in which the electrode plate group and an electrolyte are contained.

In the first secondary battery of the present disclosure, at least one of the positive electrode plate and the negative electrode plate includes a porous protective film formed on a surface of an active material layer, and a plurality of grooves are formed in a surface of the at least one of the electrode plates in which the porous protective film is formed on the surface of the active material layer. The grooves are formed also in the surface of the active material layer so that each of the grooves extends from a surface of the porous protective film to the surface of the active material layer.

With this configuration, an internal short-circuit can be suppressed by the porous protective film. Also, in the electrode plate group, spaces are provided between the separator and the positive electrode plate or the negative electrode plate due to the grooves provided in the porous protective film and the active material layer. Thus, an electrolyte is uniformly impregnated into an electrode plate group through the spaces so as to reach even bottom part of the electrode plate group, and also the electrolyte is impregnated into the other electrode plate of an opposite polarity through the thin separator. Therefore, a nonuniform distribution of the electrolyte in the electrode plate group can be avoided, and the occurrence of dry-up of the electrolyte can be effectively suppressed when the battery is charged/discharged. Moreover, in the electrolyte injection step, the electrolyte injection time can be largely reduced.

In the first secondary battery of the present disclosure, the at least one of the electrode plates has an active material coated part in which the active material layer is formed on at least one surface of a current collector core material and a core material exposed part in which the active material layer is not formed. In this case, it is preferable that the porous protective film is formed on part of the surface of the active material layer located in the active material coated part, and in the active material coated part, the grooves are formed also in the surface of the active material layer so that each of the grooves extends from the surface of the porous protective film to the surface of the active material layer.

With this configuration, it can be avoided that the porous protective film is unnecessarily formed in the core material exposed part which does not contribute to a battery reaction. Thus, the porous protective film does not exist in the core material exposed part, and a battery capacity is increased accordingly. Also, in welding a current collector lead to the core material exposed part, the exfoliation process step for removing the porous protective film from part of the core material exposed part to which the current collector lead is welded can be omitted, so that productivity of the secondary battery is increased.

In the first secondary battery of the present disclosure, the porous protective film may be formed so as to have a thickness of 2 μm or more and 20 μm or less.

In this case, if the thickness of the porous protective film is set to be smaller than 2 μm, the protective function of the porous protective film for preventing an internal short-circuit is insufficient, and if the thickness is larger than 100 μm, the porous protective film prevents a reaction between the electrode plate and electrolyte ions, thus resulting in degradation in battery performance. Therefore, if the thickness of the porous protective film is preferably set to be 2 μm or more and 100 μm or less, the porous protective film can be formed so that the protective function thereof is ensured and also the porous protective film does not cause degradation in battery performance. Furthermore, in the first secondary battery, the grooves are formed not only in the surface of the porous protective film but also in part of the active material layer, and thus, the thickness of the porous protective film is preferably 2 μm or more and 20 μm or less. Moreover, the thickness of the electrode plate can be reduced, compared to the case where a protective tape is attached to the electrode plate to ensure the safety of a secondary battery, so that the capacity of the battery can be increased accordingly. Also, since the electrode plate group can be formed by winding the electrode plates each having a small thickness, the occurrence of winding displacement can be prevented.

In a second secondary battery according to the present disclosure, at least one of the positive electrode plate and the negative electrode plate includes a porous protective film formed on a surface of an active material layer, and a plurality of grooves are formed only in a surface of the porous protective film.

With this configuration, as in the first secondary battery of the present disclosure, an internal short-circuit can be suppressed by the porous protective film. Also, in the electrode plate group, spaces are provided between the separator and the positive electrode plate or the negative electrode plate due to the grooves provided in the porous protective film. Thus, an electrolyte is uniformly impregnated into an electrode plate group through the spaces so as to reach even bottom part of the electrode plate group, and also the electrolyte is impregnated into the other electrode plate of an opposite polarity through the thin separator. Therefore, a nonuniform distribution of the electrolyte in the electrode plate group can be avoided, and the occurrence of dry-up of the electrolyte can be effectively suppressed when the battery is charged/discharged. Moreover, in the electrolyte injection step, the electrolyte injection time can be largely reduced.

In the second secondary battery of the present disclosure, the porous protective film may be formed so as to have a thickness of 10 μm or more and 100 μm or less.

In this case, if the thickness of the porous protective film is set to be smaller than 2 μm, the protective function of the porous protective film is insufficient, and if the thickness is larger than 100 μm, the porous protective film prevents a reaction between the electrode plate and electrolyte ions, thus resulting in degradation in battery performance. Therefore, if the thickness of the porous protective film is preferably set to be 2 µm or more and 100 µm or less, the porous protective film can be formed so that the protective function thereof is ensured, and also the porous protective film does not cause degradation in battery performance. Furthermore, in the second secondary battery, because the grooves are formed only in the surface of the porous protective film, in order to form the grooves in the surface of the porous protective film without causing the generation of cracks, the thickness of the porous protective film is preferably set to be 10 µm or more. Moreover, the thickness of the electrode plate can be reduced, compared to the case where a protective tape is attached to the electrode plate to ensure the safety of a secondary battery, so that the capacity of the battery can be increased accordingly. Also, since the electrode plate group can be formed by winding the electrode plates each having a small thickness, the occurrence of winding displacement can be prevented.

In each of the first and second secondary batteries of the present disclosure, it is preferable that each of the grooves has a cross-sectional shape in which each of opening top portions and groove bottom corner portions of the groove has an arc shape.

With this configuration, the generation of cracks in the active material to be caused by forming the grooves can be prevented, so that the problem of fall-off of the active material from the active material layer in forming the grooves can be suppressed.

In each of the first and second secondary batteries of the present disclosure, it is preferable that the grooves are formed so that each of the grooves has a depth of 4 µm or more and 20 µm or less.

With this configuration, spaces through which an electrolyte can be efficiently impregnated into the electrode plate group in the electrolyte injection step in producing a battery can be provided between the electrode plate and the separator by setting the depth of the grooves to be 4 µm or more. When the depth of the grooves is set to be 20 µm or less, significant damage to the active material layer to be caused by forming the grooves can be prevented, and thus, reduction in peel-off resistant strength for peeling of the active material from the current collection core material in the electrode active material layer can be suppressed. Therefore, reduction in battery capacity due to fall-off of the active material from the active material layer is less likely caused, and also, an internal short-circuit less likely occurs due to the active material which has been fallen off and passed through the separator to be contact with the other electrode plate of an opposite polarity.

In each of the first and second secondary batteries of the present disclosure, the grooves may be formed so that a total volume of the grooves is 0.1% or more and 10% or less of a sum of a volume of the active material layer and a volume of the porous protective film.

With this configuration, damage to the active material layer to be caused in forming the grooves can be reduced, and fall-off of the active material from the active material layer can be suppressed. Furthermore, the electrolyte injection property and impregnation of the electrolyte in the electrolyte injection step after the electrode plate group is placed in the battery case can be improved. Moreover, the electrolyte can be maintained in the electrode plate group even though expansion and contraction of the negative electrode plate are repeated when the battery is charged/discharged, so that an excellent cycle life can be ensured.

In each of the first and second secondary batteries of the present disclosure, the grooves may be formed so that each of the grooves extends from one end of the at least one of the electrodes to the other end thereof in a widthwise direction thereof.

With this configuration, since the grooves are formed so that each of the grooves extends from one end to the other end of the electrode active material layer in the widthwise direction thereof, the electrolyte flows between the electrode plate and the separator through the grooves to be impregnated into the entire electrode plate even when the electrode plates are tightly wound to form the electrode plate group. Thus, impregnation of the electrolyte into the electrode plate group is dramatically improved, and the electrolyte injection time can be largely reduced. In addition, the occurrence of dry-up of the electrolyte can be effectively suppressed when the battery is charged/discharged, and also a nonuniform distribution of the electrolyte in the electrode plate group can be avoided.

In each of the first and second secondary batteries, the grooves may be formed so that each of the grooves extends so as to be perpendicular with or tilted from a longitudinal direction of the at least one of the electrode plates.

With this configuration, the flow of the electrolyte through the grooves is even more effectively facilitated, thus resulting in improvement of the electrode injection property and impregnation of the electrolyte into the electrode plate group. As a result, the generation of stress in the winding process for forming the electrode plate group can be suppressed. Moreover, cutting of the electrode plate in the electrode plate can be effectively prevented.

In each of the first and second secondary batteries, the porous protective film may contain at least one of silica and alumina.

With this configuration, a highly reliable insulating porous protective film can be formed.

A method for producing a secondary battery according to the present disclosure is a method for producing a secondary battery including an electrode plate group in which a positive electrode plate and a negative electrode plate are wound or stacked with a separator interposed therebetween and a battery case in which the electrode plate group and an electrolyte are contained. Specifically, the method includes the steps of: a) forming a positive electrode active material layer on a surface of a current collector core material of a positive electrode and a negative electrode active material layer on a surface of a current collector core material of a negative electrode; b) forming a porous protective film on a surface of at least one of the positive electrode active material layer and the negative electrode active material layer to form a positive electrode plate and a negative electrode plate; c) forming, after the step b), a plurality of grooves at least in a surface of the porous protective film; d) forming, after the step c), an electrode plate group by winding or stacking the positive electrode plate and the negative electrode plate with a separator interposed therebetween; and e) placing and injecting, after the step d), the electrode plate group and the electrolyte in the battery case, and sealing the battery case.

According to this method, an internal short-circuit can be suppressed by the porous protective film. Furthermore, in the electrode plate group, spaces are provided between the separator and the positive electrode plate or the negative electrode plate due to the grooves provided at least in the porous protective film. Thus, an electrolyte is uniformly impregnated into an electrode plate group through the spaces so as to reach even bottom part of the electrode plate group, and also the electrolyte is impregnated into the other electrode plate of an opposite polarity through the thin separator. Therefore, a nonuniform distribution of the electrolyte in the electrode plate group can be avoided, and the occurrence of dry-up of the electrolyte can be effectively suppressed when the battery is charged/discharged. Moreover, in the electrolyte injection step, the electrolyte injection time can be largely reduced.

In the method for producing a secondary battery according to the present disclosure, it is preferable that in the step c), the plurality of grooves are formed simultaneously in the surface of the porous protective film and in the surface of the at least one of the active material layers.

According to this method, the porous protective film is formed on the surface of the active material layer and then the grooves are formed simultaneously in the porous protective film and the active material layer. Thus, unlike the case where the grooves are formed in the surface of the active material layer and then the porous protective film is formed on the surface, it is possible to prevent the problem of filling the obtained grooves with the porous protective film or the like.

In the method for producing a secondary battery according to the present disclosure, it is preferable that in the step c), the grooves are formed, using rollers each having projections formed on a circumference surface thereof, so that only the projections of the circumference surface of each of the rollers are in contact with the surface of the porous protective film.

According to this method, in forming the grooves, it can be prevented the active material from being attached to the parts of the circumferential surface of each of the rollers, which are located other than the projections. Thus, peel-off of the active material from the active material layer can be prevented, the grooves with a uniform depth can be formed, and maintenance can be performed to the rollers in a simple manner. Furthermore, expansion of the electrode plate by rolling can be suppressed.

Effects of the Invention

According to the present disclosure, a secondary battery allows improvement of the electrolyte injection property and impregnation in the electrolyte injection step resulting in high yield production of the secondary battery, and also can achieve safety with which the occurrence of an internal short-circuit and the like can be effectively prevented.

BRIEF DESCRIPTION OF THE DRAWINGS

FIG. 2(a) is a perspective view of an electrode plate hoop material; FIG. 2(b) is a perspective view of the electrode plate hoop material in which a porous protective film is formed on a surface of an active material layer; FIG. 2(c) is a perspective view of the electrode plate hoop in which grooves are formed in the surface of the active material layer as well as in the porous protective film; and FIG. 2(d) is a perspective view of an electrode plate.

EXPLANATION OF REFERENCE NUMERALS

Figure 1:
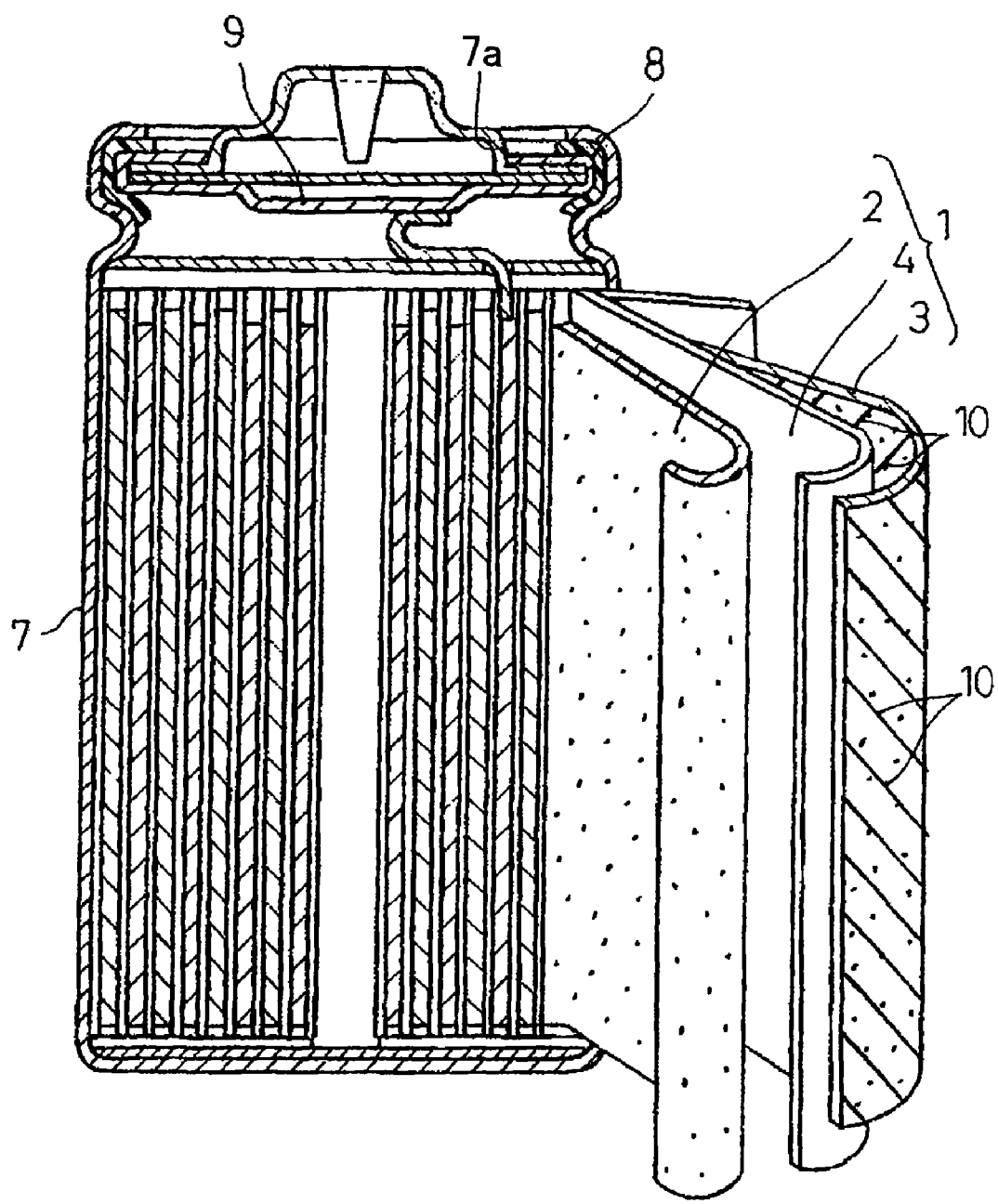
FIG. 1 is a vertical cross-sectional view schematically illustrating a secondary battery according to an embodiment of the present disclosure.

1 Electrode plate group
2, 2A Positive electrode plate
3, 3A Negative electrode plate
4 Separator
7 Battery case
7a Opening portion
10, 31 Grooves
12, 29 Current collector core material
13 Negative electrode active material layer
14 Double-coated part (active material coated part)
17 Single-coated part (active material coated part)
18 Core material exposed part
28 Porous protective film
30 Positive electrode active material layer

BEST MODE FOR CARRYING OUT THE INVENTION

Hereinafter, preferred embodiments of the present disclosure will be described with reference to the accompanied drawings. FIG. 1 is a vertical cross-sectional view schematically illustrating a secondary battery according to an embodiment of the present disclosure. In this embodiment, a lithium secondary battery will be described as an application example of the present disclosure. The lithium secondary battery is produced according to the following method. First, a positive electrode plate 2 including composite lithium oxide (oxide of transition metal and lithium) as an active material and a negative electrode plate 3 including a material capable of containing lithium are spirally wound with a separator 4 interposed therebetween to form an electrode plate group 1 (Step (d)). The electrode plate group 1 is placed in a cylindrical battery case 7 with a bottom (Step (e)). Subsequently, a predetermined amount of an electrolyte (not shown) of a nonaqueous solvent is injected into the battery case 7 (Step (e)) so as to be impregnated into the electrode plate group 1. Thereafter, while a sealing plate 9 with a gasket 8 attached to its circumference edge is inserted in an opening portion 7a of the battery case 7, the sealing plate 9 is bent inwardly in a radial direction of the opening portion 7a and crimped, so that the opening portion 7a of the battery case 7 is closed (Step (e)) and the battery case 7 is closely sealed.

In the lithium secondary battery of this embodiment, a porous protective film, which will be described later, is formed on a surface of each of negative electrode active material layers respectively provided on both surfaces of a current collector core material of a negative electrode (Step (b)), and then a plurality of grooves 10 are formed simultaneously in respective surfaces of the porous protective film and the negative electrode active material layer which are provided on each of both surfaces of the current collector core material 12 of the negative electrode (Step (c)). In this case, the grooves are formed in each surface of the negative electrode plate 3 so that each of the grooves extends from the surface of the porous protective film to the surface of the negative electrode active material layer. In other words, the grooves formed on the surface of the porous protective film overlap with the grooves formed in the surface of the negative electrode active material layer. The grooves 10 formed in the surfaces of the porous protective film and the negative electrode active material layer provided on one surface of the negative electrode plate 3 intersect in a grade separated crossing manner with the grooves 10 formed in the surfaces of the porous protective film and the negative electrode active material layer provided on the other surface of the negative electrode plate 3, and an angle at which the grooves 10 of the one surface of the negative electrode plate 3 intersect with the grooves 10 of the other surface of the negative electrode plate 3 is 90 degrees. Thereafter, in the step of injecting an electrolyte, the electrolyte is injected through the grooves 10 to facilitate impregnation of the electrolyte, so that the electrolyte injection property and impregnation of the electrolyte into the electrode plate group 1 is improved. Note that the lithium secondary battery according to the present disclosure may be configured so that a porous protective film is formed on either one of the positive electrode plate 2 and the negative electrode plate 3 and grooves are formed in a surface of the porous protective film.

FIGS. 2(a) through 2(d) are views illustrating respective steps for producing the electrode plate 3. FIG. 2(a) illustrates, for example, a negative electrode plate hoop material 11 before being divided into separate negative electrode plates 3. The negative electrode plate hoop material 11 is produced in the following manner. A negative electrode mixture paste is prepared by mixing artificial graphite as an active material, styrene-butadiene copolymer rubber particle dispersant as a binder, and carboxymethyl cellulose as a thickener with an adequate amount of water. Next, the negative electrode mixture paste is partially applied to both surfaces of a current collector core material 12 of a long strip shaped copper foil having a thickness of 10 µm and is dried, and then the current collector core material 12 is compressed by roll pressing so that a total thickness thereof is about 200 µm. Thus, a negative electrode active material layer 13 is formed on the current collector core material 12 of the negative electrode (Step (a)). Thereafter, the negative electrode active material layer 13 is subjected to slitter operation so as to have a width of about 60 mm. In the negative electrode plate hoop material 11 formed in the above-described manner, a double-coated part 14 in which the negative electrode active material layer 13 is applied on each of both surfaces of the current collector core material 12, a single-coated part 17 in which the negative electrode active material layer 13 is applied on only one surface of the current collector core material 12, and a core material exposed part 18 in which the negative electrode active material layer 13 is not formed on the current collector core material 12 together form a single electrode plate component part 19, and multiple ones of the electrode plate component part 19 are continuously formed along a longitudinal direction. The electrode plate component part 19 in which the negative electrode active material layer 13 is partially provided can be formed in a simple manner by applying the negative electrode active material layer 13 using a known intermittent coating process which has been already established in the art.

FIG. 2(b) illustrates the negative electrode plate hoop material 11 in a state where a porous protective film 28 is formed on each surface of the negative electrode active material layer 13 by applying a paste insulation material obtained by mixing an inorganic material with a small amount of a water-soluble polymer binder and then drying it (Step (b)). Note that in the core material exposed part 18, the porous protective film 28 is not formed. Thus, it can be avoided that the porous protective film 28 is unnecessarily formed in the core material exposed part 18 which does not contribute to a battery reaction. As a result, the porous protective film 28 does not exist in the core material exposed part 18, and a battery capacity is increased accordingly. Also, in welding a current collector lead 20, which will be described later in FIG. 2(d), to the core material exposed part 18, the step of removing the porous protective film 28 from part of the core material exposed part 18 to which the current collector lead 20 is welded can be omitted, so that productivity of the lithium secondary battery is increased. Note that as a method for applying the paste insulation material, a known coating method can be used. For example, a method disclosed in Japanese Published Application No. 2007-117973 can be used.

When being incorporated in the battery of FIG. 1, the porous protective film 28 exhibits its original function as a battery resulting from being porous, that is, the porous protective film 28 exhibits the function of preventing an electrode reaction between each electrode plate and electrolytic ions in the electrolyte, as well as the protective function of suppressing the occurrence of an internal short-circuit. The above-described inorganic material preferably includes at least one of a silica material and an alumina material. The reason for this is that silica and alumina materials both are materials which are excellent in heat resistance, electrochemical stability within a range of use for a lithium secondary battery, and resistance to dissolving in an electrolyte and are also suitable for coating, and thus the porous protective film 28 having high reliability and being capable of providing electrical insulation can be achieved by using silica and alumina materials. Specifically, in terms of electrochemical stability, an alumina material is preferable as an inorganic material. As a binder, polyvinylidene fluoride is preferably used.

Either when the porous protective film 28 is formed using a silica material or when the porous protective film 28 is formed using an alumina material, a known method can be used to form a paste insulation material can be used. For example, a method disclosed in Japanese Published Application No. 2007-103356 and the like can be used. Specifically, when the porous protective film 28 is formed using a silica material, the paste insulation material can be formed by mixing 100 parts by weight of silica powder having an average particle size of 1.0 µm, 10 parts by weight of polyvinylidene fluoride with respect to 100 parts by weight of the silica powder and an adequate amount of N-methyl-2-pyrrolidone by an agitator. When the porous protective film 28 is formed using an alumina material, the paste insulation material can be formed by mixing 100 parts by weight of alumina ($Al_2O_3$) powder having an average particle size of 1.0 µm, 10 parts by weight of polyvinylidene fluoride with respect to 100 parts by weight of the alumina powder and an adequate amount of N-methyl-2-pyrrolidone by an agitator.

The porous protective film 28 is formed so as to have a thickness d of 2 µm or more and 100 µm or less (shown in FIG. 4 which will be described later). The reason for this is that if the thickness d is set to be smaller than 2 µm, the protective function of preventing an internal short-circuit is insufficient, and if the thickness d is larger than 100 µm, the porous protective film 28 prevents reaction between each electrode plate and electrolytic ions to reduce battery performance. Therefore, to prevent an internal short-circuit, the porous protective film 28 preferably has a large thickness. However, when the separator 4 and the porous protective film 28 are used together as in this embodiment, the thickness d of the porous protective film 28 may be about 20 µm. Accordingly, in this embodiment, the thickness d of the porous protective film 28 is preferably 2 µm or more and 20 µm or less. Note that in recent years, techniques in which the separator 4 of resin is not provided between the positive electrode 2 and the negative electrode 3 have been proposed, and when the separator 4 is not provided, the porous protective film 28 can be formed also to have the function as a separator by setting the thickness d of the porous protective film 28 to be about 100 µm.

Figure 2:
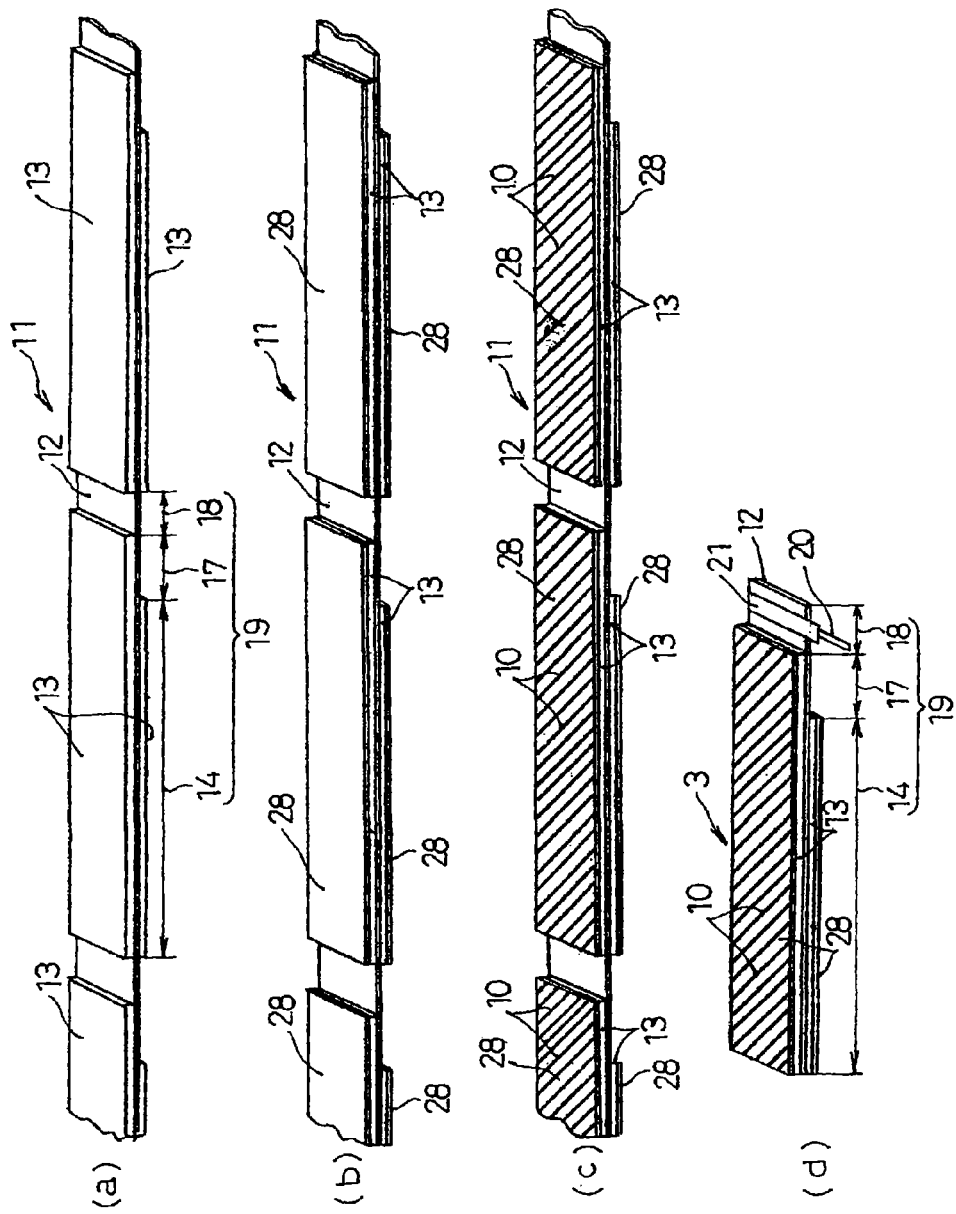
FIGS. 2(a) through 2(d) are views illustrating respective steps for producing an electrode plate for the secondary battery of the embodiment.

FIG. 2(*c*) illustrates the negative electrode plate hoop material 11 in a state where the grooves 10 shown in FIG. 1 are simultaneously formed in respective surfaces of the porous protective film 28 and the negative electrode active material layer 13 (Step (c)). The grooves 10 will be described in detail later. The negative electrode plate hoop material 11 in which the grooves 10 are formed is cut at each of boundaries of the double-coated parts 14 and the core material exposed parts 18 to be divided into separate electrode plate component parts 19, the current collector lead 20 is attached to the current collector core material 12 in the core material exposed part 18 by welding, and the current collector lead 20 is covered by an insulation tape 21 attached onto the current collector core material 12. Thus, the negative electrode plate 3 of the lithium secondary battery is formed.

With the negative electrode plate 3 having the above-described configuration, the following effects can be achieved. That is, the porous protective film 28 is formed on the surface of the negative electrode active material layer 13, and the grooves 10 are simultaneously formed in the surfaces of the porous protective film 28 and the negative electrode active material layer 13. When the electrode plate group 1 is formed using the negative electrode plate 3, a secondary battery which allows both of safety with which the occurrence of an internal short-circuit can be suppressed and improvement of the electrolyte injection property and impregnation in the electrolyte injection step can be achieved.

Also, since the porous protective film 28 is formed on the surface of the negative electrode active material layer 13 and the grooves 10 are simultaneously formed in the surfaces of the porous protective film 28 and the negative electrode active material layer 13, unlike the case where the grooves are formed in the surface of the negative electrode active material layer and then the porous protective film is formed on the surface, it is possible to prevent filling the grooves formed in the surface of the negative electrode active material layer with the insulation material (i.e., a silica material or an alumina material) of the porous protective film 28.

Moreover, since the grooves 10 are simultaneously formed in the surfaces of the porous protective film 28 and the negative electrode active material layer 13, the depth D (shown in FIG. 4 which will be described later) of the grooves 10 can be set to be approximately equal to or larger than the thickness d of the porous protective film 28. That is, in this embodiment, the grooves 10 are formed also in the surface of the negative electrode active material layer 13 provided under the porous protective film 28, and therefore, the grooves 10 can be formed without causing the generation of cracks in the porous protective film 28 even when the depth D of the grooves 10 is approximately equal to or larger than the thickness d of the porous protective film 28. Specifically, as described above, the thickness d of the porous protective film 28 is preferably 2 µm or more and 20 µm or less and, as described later, the depth D of the grooves 10 is preferably 4 µm or more and 20 µm or less.

When the negative electrode plate 3 and the positive electrode plate 2 overlapping with each other are spirally wound with the separator 4 interposed therebetween to form the electrode plate group 1, winding is started with the core material exposed part 18 to which the current collector lead 20 is attached, as a winding start end. Accordingly, at center part of the obtained electrode plate group 1, a surface of the single-coated part 17 of the negative electrode plate 3 on which the negative electrode active material layer 13 does not exist is an inner surface of the electrode plate group 1. The inner surface of the electrode plate group 1 is part which does not contribute to a battery reaction. Thus, it can be avoided that the negative electrode active material layer 13 is unnecessarily formed in the part which does not contribute to a battery reaction, so that a spatial volume in the battery case 7 can be effectively used to increase a capacity of a battery by a corresponding amount.

Figure 3:
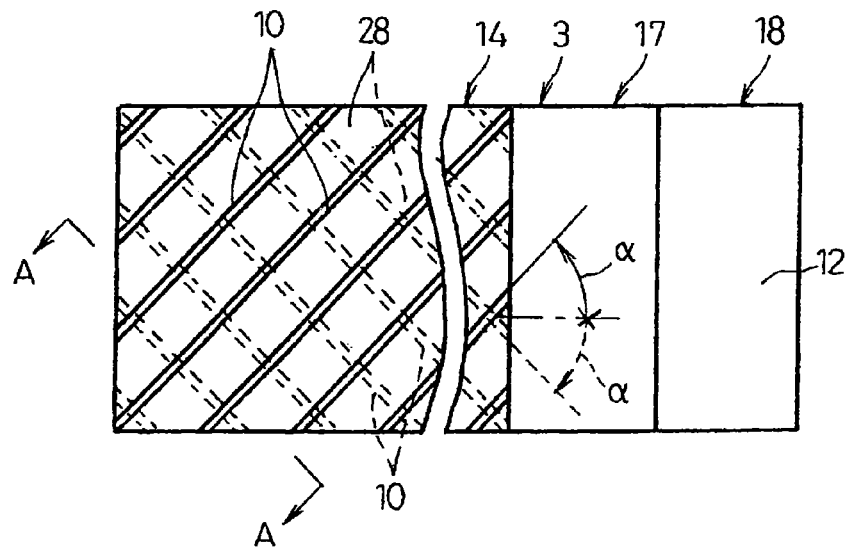
FIG. 3 is an enlarged plan view of the electrode plate of the embodiment, with part omitted.

FIG. 3 is an enlarged plan view of the negative electrode plate 3 with part omitted. Note that in FIG. 3, the grooves 10 indicated by solid lines are the grooves 10 formed in the surfaces of the porous protective film 28 and the negative electrode active material layer 13 which are provided on one surface (a top surface in FIG. 3) of the negative electrode plate 3, and the grooves 10 indicated by dashed lines are the grooves formed in the surfaces of the porous protective film 28 and the negative electrode active material layer 13 which are provided on the other surface (a back surface in FIG. 3) of the negative electrode plate 3.

The grooves 10 are formed in the surfaces of the porous protective film 28 and the negative electrode active material layer 13 provided on one surface of the negative electrode plate 3 and in the surfaces of the porous protective film 28 and the negative electrode active material layer 13 provided on the other surface of the negative electrode plate 3 so as to be tilted at an angle α (for example, 45 degrees) from a longitudinal direction (i.e., a lateral direction in FIG. 3) of the negative electrode plate 3 in different directions from one another, and the grooves 10 on one surface of the negative electrode plate 3 intersect with the grooves 10 on the other surface of the negative electrode plate 3 in a grade separated crossing manner. The grooves 10 are formed with a constant pitch so as to be arranged in parallel with one another in each of both surfaces of the negative electrode plate 3, and each of the grooves 10 extends from one end to the other end of the negative electrode active material layer 13 in the widthwise direction (i.e., a perpendicular direction to the longitudinal direction or a longitudinal direction in FIG. 3). Effects of this arrangement of the grooves 10 in the negative electrode plate 3 will be described later.

Figure 4:
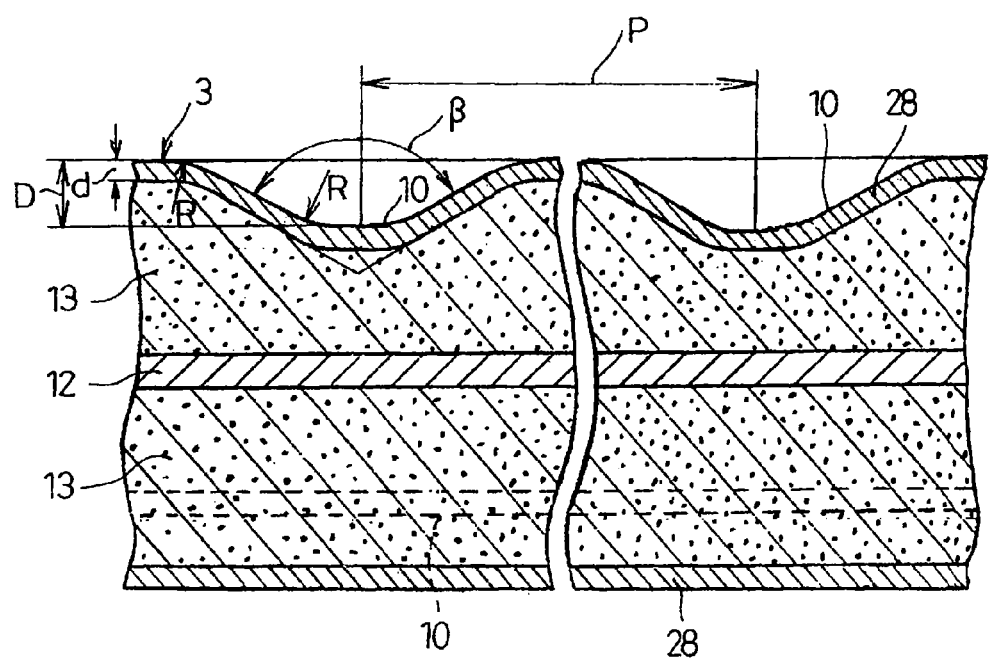
FIG. 4 is an enlarged cross-sectional view taken along the line A-A of FIG. 3.

FIG. 4 is an enlarged cross-sectional view taken along the line A-A of FIG. 3, and illustrates a cross-sectional view and an arrangement pattern of the grooves 10. The grooves 10 are arranged with a pitch P of 170 µm in each of both surfaces of the negative electrode plate 3. Moreover, the grooves 10 are formed so that a cross-sectional shape of each of the grooves 10 has a substantially inverted trapezoid shape. A depth D of each of the grooves 10 of this embodiment is 8 µm, each of both side walls of each of the grooves 10 is tilted so that a distance between the side walls thereof is broadened toward an opening to the groove and an apex angle β between the both walls of the groove is 120 degrees, and each of groove bottom corner portions each of which is a boundary between a bottom surface and each of the walls of each of the groove 10 and opening top portions of each of the grooves 10 has an arc shape with R of 30 µm. With the grooves 10 each having the above-described shape, the generation of cracks in the negative electrode active material layer 13 in forming the grooves 10 can be prevented, and thus fall-off of a negative electrode active material forming the grooves 10 from the negative electrode active material layer 13 due to the generation of cracks can be suppressed.

In this embodiment, the case where the pitch P of the grooves 10 is 170 µm and the depth D of the grooves 10 is 8 µm has been described as an example, but the pitch P may be set within a range of 100 µm or more and 200 µm or less. Also, the depth D of the grooves 10 may be set to be within a range of 4 µm or more and 20 µm or less. The depth D is more preferably set to be within a range of 5 μm or more and 15 μm or less, and even more preferably within a range of 6 μm or more and 10 μm or less. A reason for this setting will be described below.

First, the depth D of the grooves 10 will be described. An electrolyte injection property of injecting an electrolyte into the electrode plate group 1 is improved as the depth D of the grooves 10 is increased. To examine this, three types of negative electrode plates in which the grooves 10 were formed with a pitch P of 170 μm in respective surfaces of the porous protective film 28 and the negative electrode active material layer 13 provided on both surfaces of each of the negative electrode plates. The respective depths D of the grooves 10 in the three types of negative electrode plates were 3 μm, 8 μm and 25 μm. Each of the negative electrode plates was placed so as to overlap with a positive electrode plate and a separator and was wound, so that three types of electrode plate groups were formed. The electrode plate groups were placed respectively in battery cases, and comparison in electrolyte injection time which it took for an electrolyte to be impregnated into each electrode plate group 1 was made between the electrode plate groups. As a result, the electrolyte injection time was 45 minutes 6 seconds for the negative electrode plate 3 in which the depth D of the grooves 10 was 3 μm, the electrolyte injection time was 23 minutes 8 seconds for the negative electrode plate 3 in which the depth D of the grooves 10 was 8 μm, and the electrolyte injection time was 15 minutes 8 seconds for the negative electrode plate 3 in which the depth D of the grooves 10 was 25 μm. It was thus clearly shown that as the depth D of the grooves 10 increased, the electrolyte injection property into the electrode plate group 1 was improved and, when the depth D of the grooves 10 was reduced to a depth smaller than 4 μm, the effect of improving the electrolyte injection property was hardly achieved.

As described above, when the depth D of the grooves 10 is increased, the electrolyte injection property is improved. However, an active material is abnormally compressed in parts of the negative electrode plate 3 in which the grooves 10 are formed, so that lithium ions can not freely move. Accordingly, lithium ion receiving property of the negative electrode plate 3 is deteriorated, so that deposition of lithium metal might be easily caused. Moreover, when the depth D of the grooves 10 is increased, the thickness of the negative electrode plate 3 is also increased accordingly, further expansion of the negative electrode plate 3 is caused, and the active material is easily peeled off from the current collector core material 12. Furthermore, when the thickness of the negative electrode plate 3 is increased, the active material is peeled off from a core material 12 in the winding step of forming the electrode plate group 1. Besides, the diameter of the electrode plate group 1 is increased according to increase in thickness of the negative electrode plate 3, so that a trouble in production is caused in which the electrode plate group 1 with an increased diameter rubs against end part of an opening portion of the battery case 7 and becomes difficult to be inserted. In addition, in a state where the active material is easily peeled off from the core material 12, peel-off of the active material from the current collector core material 12 occurs in the winding step and the conductivity is reduced, so that battery properties are deteriorated.

The peel-off resistant strength for peeling of the active material from the current collection core material 12 in the negative electrode active material layer 13 is reduced as the depth D of the grooves 10 is increased. The reason for this is that, as the depth D of the grooves 10 is increased, the thickness of the negative electrode active material layer 13 is increased and, when the thickness of the negative electrode active material layer 13 is increased, large force is applied in a direction which causes the active material to be peeled off from the core material 12. As a result, the peel-off resistant strength is reduced. To examine this, four types of negative electrode plates 3 in which the grooves 10 were formed at a pitch P of 170 μm were prepared. The depths D of the grooves 10 in the four types of negative electrode plates 3 were 25 μm, 12 μm, 8 μm and 3 μm. A peel-off resistant strength test was performed to the negative electrode plates 3. The results showed that the peel-off resistant strengths of the negative electrode plates 3 in decreasing order of the depth D were 4.7 (N/m), 5.4 (N/m), 5.4 (N/m) and 6.9 (N/m). Thus, it can be understood from the results that as the depth D of the grooves 10 is increased, the peel-off resistant strength is reduced.

The results obtained from the above-described various points will be summarized below. When the depth D of the grooves 10 is set to be smaller than 4 μm, the effect of efficiently injecting an electrolyte into the electrode plate group 1 through a space provided between the negative electrode plate 3 and the separator 4 due to the formation of the grooves 10 becomes insufficient in the electrolyte injection step in producing a battery. On the other hand, when the depth D of the grooves 10 is set to be larger than 20 μm, the peel resistant strength for peel-off of the active material in the negative electrode active material layer 13 from the core material 12 is reduced because significant damage to the negative electrode active material layer 13 is caused in forming the grooves 10, so that a battery capacity might be reduced and, furthermore, the active material which has been fallen off goes through the separator 4 to be in contact with the positive electrode plate 2, thereby causing an internal short circuit. Therefore, by forming the grooves 10 so that the depth D thereof is as small as possible and the number of the grooves 10 is increased, the above-described problems can be prevented and a good electrolyte injection property can be achieved. To obtain this configuration, it is necessary to set the depth D of the grooves 10 to be within a range of 4 μm or more and 20 μm or less, and it is preferable to set the depth D to be within a range of 5 μm or more and 15 μm or less, and more preferable to set the depth D to be within a range of 6 μm or more and 10 μm or less. Thus, in this embodiment, the depth D of the grooves 10 is set to be 8 μm.

Next, the pitch P of the grooves 10 will be described. The correlation between the pitch P of the grooves 10 and the electrolyte injection property is as follows: when the pitch P of the grooves 10 is smaller, the number of the grooves 10 becomes larger and thus a total volume of the grooves 10 becomes larger, resulting in improvement of the electrolyte injection property. To examine this, three types of negative electrode plates in which the grooves 10 having a depth D of 8 μm were formed in respective surfaces of the porous protective film 28 and the negative electrode active material layer 13 provided on each of both surfaces of each of the negative electrode plates with different pitches were prepared. The pitches P in the three different types of negative electrode plates were 80 μm, 170 μm and 260 μm. Three types of electrode plate groups respectively including the three types of negative electrode plates were placed in battery cases 7, respectively, and comparison in the electrolyte injection time was made between the electrode plate groups. As a result, the electrolyte injection time was 20 minutes 5 seconds for the negative electrode plate including the grooves provided with a pitch P of 80 μm, the electrolyte injection time was 23 minutes 6 seconds for the negative electrode plate including the grooves provided with a pitch P of 170 μm, and the electrolyte injection time was 25 minutes 48 seconds for the negative electrode plate including the grooves provided with a pitch P of 260 μm. It was thus clearly shown that as the pitch P of the grooves 10 was reduced, the electrolyte injection property into the electrode plate group was improved.

When the pitch P of the grooves 10 is set to be smaller than 100 μm, the peel-off resistant strength for peel-off of the active material in the negative electrode active material layer 13 from the core material 12 is advantageously increased. However, the number of the grooves 10 is increased and, accordingly, the number of compressed parts of the negative electrode active material layer 13 is increased. As a result, the filling density of the active material is increased too much. Also, part of the surface of the negative electrode active material layer 13 in which the grooves 10 do not exist is reduced too much, so that part between adjacent ones of the grooves 10 has a line projection shape that can be easily crushed. If this part having line projection shape is crushed when the negative electrode plate 3 is chucked in a transferring process, there arises a problem in which the thickness of the negative electrode active material layer 13 varies.

On the other hand, when the grooves 10 are formed with a large pitch P, i.e., a larger pitch than 200 μm, expansion of the core material 12 occurs to cause a large stress to be applied to the negative electrode active material layer 13. Also, the peel-off resistant strength for peel-off of the active material from the core material 12 is reduced, so that fall-off of the active material easily occurs. This reduction in peel-off resistant strength will be described with reference to FIG. 5. When the negative electrode plate hoop material 11 is passed through between an upper groove processing roller 22 and a lower groove processing roller 23, groove processing line projections 22a of the upper groove processing roller 22 and groove processing line projections 23a of the lower groove processing roller 23 are embedded into the surfaces of the porous protective film 28 and the negative electrode active material layer 13 provided on each of both surfaces of the negative electrode plate 3, thereby forming the grooves 10. At this time, in the current collector core material 12, loads of the groove processing line projections 22a and 23a are simultaneously applied to the same location and thus are cancelled off only in parts where the groove processing line projections 22a and 23a intersect with one another in a grade separated crossing manner, in other words, where the grooves 10 formed in the surfaces of the porous protective film 28 and the negative electrode active material layer 13 provided on one surface of the negative electrode plate 3 intersect in a grade separated crossing manner with the grooves 10 formed in the surfaces of the porous protective film 28 and the negative electrode active material layer 13 provided on the other surface of the negative electrode plate 3. In other parts, only the current collector core material 12 receives loads applied by the groove processing line projections 22a and 23a which are embedded into the porous protective film 28 and the negative electrode active material layer 13. Therefore, in the case where the grooves 10 are formed so that the grooves 10 formed in the surfaces of the porous protective film 28 and the negative electrode active material layer 13 provided on the one surface of the negative electrode plate 3 intersect at an intersection angle of 90 degrees in a grade separated crossing manner with the grooves 10 formed in the surfaces of the porous protective film 28 and the negative electrode active material layer 13 provided on the other surface of the negative electrode plate 3, when the pitch P of the grooves 10 is large, a span at which the core material 12 receives loads applied by the groove processing line projections 22a and 23a is increased and a burden on the core material 12 is increased, thus resulting in expansion of the core material 12. Accordingly, the active material is peeled off in the negative electrode active material layer 13 or the active material is peeled off from the core material 12, so that the peel-off resistant strength of the negative electrode active material layers 13 with respect to the core material 12 is reduced.

To confirm that as the pitch P of the grooves 10 is increased, the peel-off resistant strength is reduced, four types of negative electrode plates in which the grooves 10 having a depth D of 8 μm were formed with different pitches were prepared. The pitches P in the four different types of negative electrode plates were 460 μm, 260 μm, 170 μm and 80 μm, and a peel-off resistant test was performed to the negative electrode plates. As a result, the peel-off resistance strengths for the four types of negative electrode plates were about 4.5 (N/m), about 4.7 (N/m), about 5.6 (N/m) and about 6.4 (N/m) in the same order as the order of their pitch P indicated above.

Furthermore, when a cross section of the negative electrode plate 3 in which the grooves 10 were formed and then were fixed with resin was observed, it was confirmed that the current collector core material 12 was curved, and also part of the active material was peeled off to be slightly lifted from the current collector core material 12. Based on the above-described various conditions, the pitch P of the grooves 10 is preferably set to be within a range of 100 μm or more and 200 μm or less.

Since the grooves 10 are formed so that the grooves 10 formed in the surfaces of the porous protective film 28 and the negative electrode active material layer 13 provided on the one surface of the negative electrode plate 3 intersect in a grade separated crossing manner with the grooves 10 formed in the surfaces of the porous protective film 28 and the negative electrode active material layer 13 provided on the other surface of the negative electrode plate 3, distortions to be generated in the negative electrode active material layer 13 when the groove processing line projections 22a and 23a are embedded into the porous protective film 28 and the negative electrode active material layers 13 are advantageously cancelled out with one another. Furthermore, when the grooves 10 are formed with a constant pitch P, by forming the grooves 10 so that the grooves 10 formed in the surfaces of the porous protective film 28 and the negative electrode active material layer 13 provided on the one surface of the negative electrode plate 3 intersect in a grade separated crossing manner with the grooves 10 formed in the surfaces of the porous protective film 28 and the negative electrode active material layer 13 provided on the other surface of the negative electrode plate 3, a distance between parts of the grooves 10 at adjacent intersections can be made the smallest, and thus, only a small burden is put on the current collector core material 12. Therefore, the peel resistant strength for peel-off of the active material from the current collector core material 12 is increased, so that fall-off of the active material can be effectively prevented.

The grooves 10 are formed so that a phase of the grooves 10 formed in the surfaces of the porous protective film 28 and the negative electrode active material layer 13 provided on the one surface of the negative electrode plate 3 and a phase of the grooves 10 formed in the surfaces of the porous protective film 28 and the negative electrode active material layer 13 provided on the other surface of the negative electrode plate 3 are symmetric with each other. Therefore, expansion of the negative electrode active material layer 13 to be caused by forming the grooves 10 occurs in both of the one and the other surfaces of the negative electrode plate 3 in an equivalent manner, and thus distortions do not exist after the grooves 10 are formed. Note that the grooves 10 may be formed so that each of the grooves 10 extends at right angles to the longitudinal direction of the negative electrode plate 3, i.e., in the widthwise direction of the negative electrode plate 3. In that case, the grooves 10 are formed so that the grooves 10 formed in the surfaces of the porous protective film 28 and the negative electrode active material layer 13 provided on one surface of the negative electrode plate 3 overlap with the grooves 10 formed in the surfaces of the porous protective film 28 and the negative electrode active material layer 13 provided on the other surface of the negative electrode plate 3 along the longitudinal direction of the grooves.

Furthermore, since the grooves 10 are formed in the surfaces of the porous protective films 28 and the negative electrode active material layers 13 provided on each of both surfaces of the negative electrode plate 3, a large amount of electrolyte can be uniformly maintained, compared to the case where grooves are formed on only surfaces of the porous protective film 28 and the negative electrode active material layer 13 provided on one surface of the negative electrode plate. Accordingly, a long cycle life can be ensured. Results of an examination to confirm this point will be described. To examine circulation (impregnation) of an electrolyte into a battery, a negative electrode plate 3 in which the grooves 10 having a depth D of 8 μm were formed with a pitch P of 170 μm in respective surfaces of the porous protective film 28 and the negative electrode active material layer 13 provided on each of both surfaces of the negative electrode plate 3, a negative electrode plate in which the grooves 10 were formed only in respective surfaces of the porous protective film 28 and the negative electrode active material layer 13 provided on one surface of the negative electrode plate, and a negative electrode plate in which no groove was formed were prepared, and then several batteries were formed for each of the battery configurations which respectively include three types of electrode plate groups formed by using the three types of negative electrode plates and then placing them in battery cases 7, respectively. Then, a predetermined amount of an electrolyte was injected into each of the battery cases and impregnated thereinto under vacuum. Thereafter, each of the electrode plate groups placed in the battery cases was decomposed and an impregnation state of each of the negative electrode plates with the electrolyte was observed. Immediately after the electrolyte was injected, the area of the negative electrode plate in which the electrolyte was impregnated was only 60% of the total area in the negative electrode plate in which no groove was formed in the both surfaces. In each of the negative electrode plate 3 in which the grooves 10 were formed only in the surfaces of the porous protective film 28 and the negative electrode active material layer 13 provided on one surface of the negative electrode plate 3 and the negative electrode plate 3 in which the grooves 10 were formed in the surfaces of the porous protective film 28 and the negative electrode active material layer 13 provided on each of both surfaces of the negative electrode plate 3, the area of the negative electrode plate in which the electrolyte was impregnated was 100% of the total area. However, in the negative electrode plate in which the grooves 10 were formed only in the surfaces of the porous protective film 28 and the negative electrode active material layer 13 provided on one surface of the negative electrode plate 3, the area of the negative electrode plate in which the electrolyte was impregnated was about 80% of the total area in the surface in which no groove 10 was formed.

Next, after the injection of the electrolyte was completed, to examine how much time is required for impregnation of the electrolyte into the entire negative electrode plate, one battery was decomposed every hour and observed. As a result, in the negative electrode plate in which the grooves were formed in the surfaces of the porous protective film 28 and the negative electrode active material layer 13 provided on each of both surfaces of the negative electrode plate, the electrolyte was impregnated at 100% in both surfaces of the negative electrode plate 3 immediately after the electrolyte was injected. In contrast, in the negative electrode plate in which the grooves 10 were formed only in the surfaces of the porous protective film 28 and the negative electrode active material layer 13 provided on one surface of the negative electrode plate, the electrolyte was impregnated at 100% after a lapse of 2 hours in the surface in which the grooves 10 were not formed, and in the negative electrode plate in which no grooves 10 was formed, the electrolyte was impregnated at 100% at a lapse of 5 hours on both surfaces of the negative electrode plate. In parts in which the electrolyte was impregnated at a lapse of some time after injection of the electrolyte, the amount of the impregnated electrolyte was smaller than the amount of the impregnated electrolyte in parts in which the electrolyte immediately was impregnated immediately after injection of the electrolyte, and the distribution of the electrolyte was nonuniform. From the results, it can be understood that where the grooves 10 have the same depth D, in the negative electrode plate 3 in which the grooves 10 are formed in the surfaces of the porous protective film 28 and the negative electrode active material layer 13 provided on both surfaces of the negative electrode plate 3, time which it takes to complete impregnation of the electrolyte can be reduced to about ½ of that in the negative electrode plate 3 in which the grooves 10 are formed only in the surfaces of the porous protective film 28 and the negative electrode active material layer 13 provided on one surface of the negative electrode plate 3, and also a cycle life as a battery can be increased.

The cycle life will be further described. By decomposing batteries under cycle tests and examining a distribution of the electrolyte in the electrode plate in which the grooves were formed only in the surfaces of the porous protective film 28 and the negative electrode active material layer 13 provided on one surface of the negative electrode plate, the cycle life of each of the batteries was determined based on how much EC (ethylene carbonate) which was a major component of a nonaqueous electrolyte was extracted per unit area of the electrode plate. The result showed that in each of the batteries, regardless of sampling parts, EC existing in the surface in which the grooves 10 were formed was larger than that in the surface in which the grooves were not formed by about 0.1- 0.15 mg. That is, it is can be understood that when the grooves are formed only in the surfaces of the porous protective film 28 and the negative electrode active material layer 13 provided on one surface of the negative electrode plate, a larger amount of EC exists in the surface of the electrode plate in which the grooves are formed than that in the surface thereof in which the grooves 10 are not formed, and this point is different from the case where the electrode plate in which the grooves are formed only in the surfaces of the porous protective film 28 and the negative electrode active material layer 13 provided on each of both surfaces of the negative electrode plate 3.

Furthermore, with the grooves 10 formed so that each of the grooves 10 extends from one end to the other end of the negative electrode active material layer 13 in the widthwise direction thereof, the electrolyte injection property of an electrolyte being injected into the electrode plate group 1 is dramatically improved and the electrolyte injection time can be largely reduced. In addition, since the impregnation of the electrolyte into the electrode plate group 1 is improved, the occurrence of dry-up of the electrolyte can be effectively suppressed when the battery is charged/discharged, and also a nonuniform distribution of the electrolyte in the electrode plate group 1 can be avoided. Moreover, with the grooves 10 formed so that each of the grooves 10 makes an angle with a longitudinal direction of the negative electrode plate 3 so as to be tilted from the longitudinal direction, the impregnation of the electrolyte into the electrode plate group 1 is improved and also the generation of stress in the winding process for forming the electrode plate group can be suppressed. Thus, cutting of the negative electrode plate in the negative electrode plate 3 can be effectively prevented.

The grooves 10 are preferably formed so that the total volume of all the grooves 10 is set to be 0.1% or more and 10% or less of the sum of the volume of the porous protective film 28 and the volume of the negative electrode active material layer. When the ratio of the total volume of the grooves 10 is smaller than 0.1% of the sum of the volumes of the porous protective film 28 and the negative electrode active material layer, the peel resistant strength is high, but the effect of improving the electrolyte injection property is not achieved. On the other hand, when the ratio is larger than 10%, the effect of improving the electrolyte injection property is achieved, but the peel-off resistant strength is reduced and peel-off of the active material is caused. For example, when the grooves 10 with a depth D of 4 μm are formed with a larger pitch P than 200 μm, the ratio is less than 0.1%. In this case, the injection time is 45 minutes or more, but the peel-off resistant strength is 6.9 (N/m). When the grooves 10 with a larger depth D than 20 μm are formed with a smaller pitch P than 100 μm, the ratio is larger than 10% and thus injection of an electrolyte is finished even before 15 minutes have elapsed. In this case, however, the peel-off resistant strength is 4.5 (N/m) and fall-off of a mixture is caused.

This shows that in the secondary battery of this embodiment, while damage to the negative electrode active material layer 13 caused in forming the grooves 10 is reduced and fall-off of the active material from the negative electrode active material layer 13 is suppressed, impregnation of the electrolyte into the electrode plate group 1 can be improved and also the electrolyte can be maintained in the electrode plate group 1 even though expansion and contraction of the negative electrode plate 3 are repeated when the battery is charged/discharged, so that an excellent cycle life can be ensured.

Figure 5:
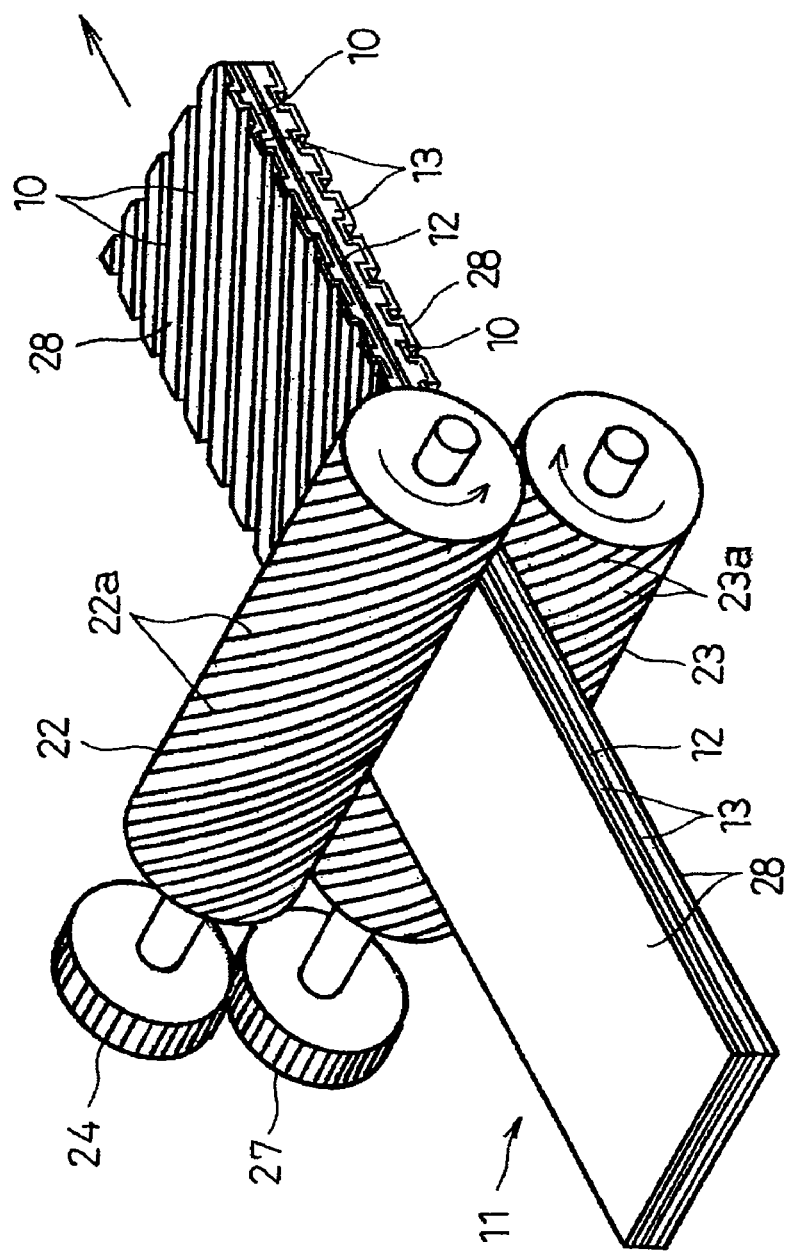
FIG. 5 is a perspective view schematically illustrating a groove processing machine for forming grooves in the electrode plate of the embodiment.

In forming the grooves 10 having the above-described cross-sectional shape, a pair of the upper groove processing roller 22 and the lower groove processing roller 23 shown in FIG. 5 are placed so as to face each other with a predetermined space therebetween, and then the negative electrode plate hoop material 11 shown in FIG. 2(*a*) is passed through the space between the upper groove processing roller 22 and the lower groove processing roller 23. Thus, the grooves 10 having the cross sectional shape shown in FIG. 4 can be formed in the surfaces of the porous protective film 28 and the negative electrode active material layer 13 provided on each of both surfaces of the negative electrode plate hoop material 11. This groove processing machine is not directly related to the technical disclosure of the application. Hereinafter, the groove processing machine will be briefly described so as to clearly show that the grooves 10 can be formed in a simple manner with high precision using the groove processing machine.

The upper groove processing roller 22 and the lower groove processing roller 23 are identical to each other and include a plurality of groove processing line projections 22*a* and 23*a* formed so that each of them makes an angle of 45 degrees with respect to an associated one of axes of the upper groove processing roller 22 and the lower groove processing roller 23. According to the following method, the groove processing line projections 22*a* and 23*a* can be formed in a simple manner with high precision. First, chrome oxide is thermal sprayed onto an entire circumference surface of an iron roller core body to coat the iron roller core body, thereby forming a ceramic layer on the entire circumference surface of the roller core body. Next, the ceramic layer is irradiated with a laser so as to be melted so that a predetermined pattern of the ceramic layer is obtained. The upper groove processing roller 22 and the lower groove processing roller 23 are substantially the same as a so-called ceramic laser engraved roll, which is generally used for printing. As described above, the upper groove processing roller 22 and the lower groove processing roller 23 are formed of chrome oxide, so that each of the rollers has a HV (Vickers hardness) of 1150 or more. Therefore, each of the upper groove processing roller 22 and the lower groove processing roller 23 has high resistance to sliding and wearing, and a lifetime several ten times or more that of an iron roller can be ensured.

As has been described, the upper groove processing roller 22 and the lower groove processing roller 23 respectively including the plurality of the groove processing line projections 22*a* and 23*a*, which are formed and arranged in the same manner, are placed one above the other so as to face each other with a predetermined space therebetween, and the negative electrode plate hoop material 11 is passed through the space between the upper groove processing roller 22 and the lower groove processing roller 23. Thus, the grooves 10 can be formed so that, as shown in FIG. 3, the grooves 10 in the surfaces of the porous protective film 28 and the negative electrode active material layer 13 provided on one surface of the negative electrode plate hoop material 11 intersect in a grade separated crossing manner with the grooves 10 in the surfaces of the porous protective film 28 and the negative electrode active material layer 13 provided on the other surface of the negative electrode plate hoop material 11.

The groove processing line projections 22*a* and 23*a* each have a cross-sectional shape which can form the grooves 10 with the cross-sectional shape shown in FIG. 4. Specifically, each of the groove processing line projections 22*a* and 23*a* has a cross-sectional shape which has an apex angle of 120 degrees and includes end corner portions each having an arc shape with R of 30 μm. The reason why the apex angle is set to be 120 degrees is that, if it is set to be a smaller angle than 120 degrees, the ceramic layer of the groove processing line projections 22*a* and 23*a* is easy to be damaged in forming the grooves 10 in the surfaces of the porous protective film 28 and the negative electrode active material layer 13.

Each end corner portion of each of the groove processing line projections 22*a* and 23*a* is formed to have an arc shape with R of 30 μm for the purpose of preventing the occurrence of cracks in the negative electrode active material layer 13 when the groove processing line projections 22*a* and 23*a* are pressed to the negative electrode active material layer 13 to form the grooves 10. The height of the groove processing line projections 22*a* and 23*a* is set to be about 20 μm or more and 30 μm or less because the most preferable range of the depth D of the grooves 10 is 6 μm or more and 10 μm or less. The reason for this is as follows. If the height of the groove processing line projections 22*a* and 23*a* is too low, parts of a circumferential surface of the upper groove processing roller 22 located around the groove processing line projections 22*a* and parts of a circumferential surface of the lower groove processing roller 23 located around the groove processing line projections 23*a* are brought in contact with the negative electrode active material layer 13 in forming the grooves 10, and thus a negative electrode active material, peeled from the negative electrode active material layer 13, is attached to the parts of the circumferential surface of the groove processing roller 22 located around the groove processing line projections 22a and the parts of the circumferential surface of the lower groove processing roller 23 located around the groove processing line projections 23a. As a result, it becomes difficult to control the depth D of the grooves 10, to perform maintenance of the upper groove processing roller 22 and the lower groove processing roller 23, and furthermore, to produce a secondary battery with excellent safety and a high capacity.

Moreover, in the active material layer, when the groove processing line projections 22a and 23a are pressed to the active material layer, parts thereof at which the projections are pressed are concaved and other parts project by about 1-1.5 μm. Therefore, if the height of the groove processing line projections 22a and 23a is equal to the depth of the grooves 10, there is no place for the active material to escape, and thus, the active material is compressed by parts of the circumference surface of the upper groove processing roller 22 in which the groove processing line projections 22a are not formed and parts of the circumference surface of the lower groove processing roller 23 in which the groove processing line projections 23a are not formed. As a result, part of the active material is attached to the parts of the circumference surface of the upper groove processing roller 22 in which the groove processing line projections 22a are not formed and the parts of the circumference surface of the lower groove processing roller 23 in which the groove processing line projections 23a are not formed, thus causing fall-off of the active material. Furthermore, when the active material is pressed by the parts of the circumference surface of the upper groove processing roller 22 in which the groove processing line projections 22a are not formed and the parts of the circumference surface of the lower groove processing roller 23 in which the groove processing line projections 23a are not formed, the negative electrode plate 3 is undesirably rolled to be expanded.

Based on the above, the height of the groove processing line projections 22a and 23a is preferably set to be sufficiently larger than the depth D of the grooves 10 to be formed.

Rotation of the upper groove processing roller 22 and the lower groove processing roller 23 is as follows. First, rotation force generated by a servomotor or the like is transmitted to the lower groove processing roller 23. Then, the rotation of the lower groove processing roller 23 is transmitted to the upper groove processing roller 22 via a pair of gears 24 and 27 pivotally attached to respective roller axes of the upper groove processing roller 22 and the lower groove processing roller 23, respectively, and meshed with each other. Thus, the upper groove processing roller 22 and the lower groove processing roller 23 are rotated at the same rotation speed.

As a method of forming the grooves 10 by embedding the groove processing line projections 22a of the upper groove processing roller 22 and the groove processing line projections 23a of the lower groove processing roller 23 in the porous protective film 28 and the negative electrode active material layer 13, there are two methods, i.e., a constant dimension method and a constant pressure method. In the constant dimension method, the depth D of the grooves 10 to be formed is set according to a gap between the upper groove processing roller 22 and the lower groove processing roller 23. In the constant pressure method, using the correlation between a pressure applied to the groove processing line projections 22a and 23a and the depth D of the grooves 10 to be formed, the lower groove processing roller 23 to which rotation force is transmitted is fixed and a pressure to be applied to the upper groove processing roller 22 provided so as to be capable of moving up and down is adjusted to determine the depth D of the grooves 10 to be formed. The grooves 10 are formed by the constant pressure method. The reason why the constant pressure method is preferable is as follows. According to the constant dimension method, the depth D of the grooves is determined according to a gap between the upper groove processing roller 22 and the lower groove processing roller 23, but it is difficult to precisely set the gap in micrometer scale. In addition, the axis runout of each of the upper groove processing roller 22 and the lower groove processing roller 23 directly affects the depth D of the grooves 10. It is therefore difficult to control the depth D. In contrast, according to the constant pressure method, those problems can be easily coped with, even though there is slight influence by a filling density of the active material in the negative electrode active material layer 13 in the double-coated part 14, by automatically performing variable adjustment to variations of thickness of the double-coated part 14 so that a pressure to be applied to press the movable upper groove processing roller 22 (for example, an air pressure of an air cylinder) is kept constant. Thus, the grooves 10 each having a predetermined depth D can be formed with high reproducibility.

However, when the grooves 10 are formed according to the constant pressure method, the groove processing machine has to have a configuration in which the negative electrode plate hoop material 11 can be passed through the space between the upper groove processing roller 22 and the lower groove processing roller 23 so that the groove processing line projections 22a and 23a are not brought in contact with the core material exposed part 18. To achieve this, stoppers can be provided between the upper groove processing roller 22 and the lower groove processing roller 23 so that the upper groove processing roller 22 is kept from moving to a closer point to the lower groove processing roller 23 than a point which leaves a minimum space between the upper groove processing roller 22 and the lower groove processing roller 23.

Figure 6:
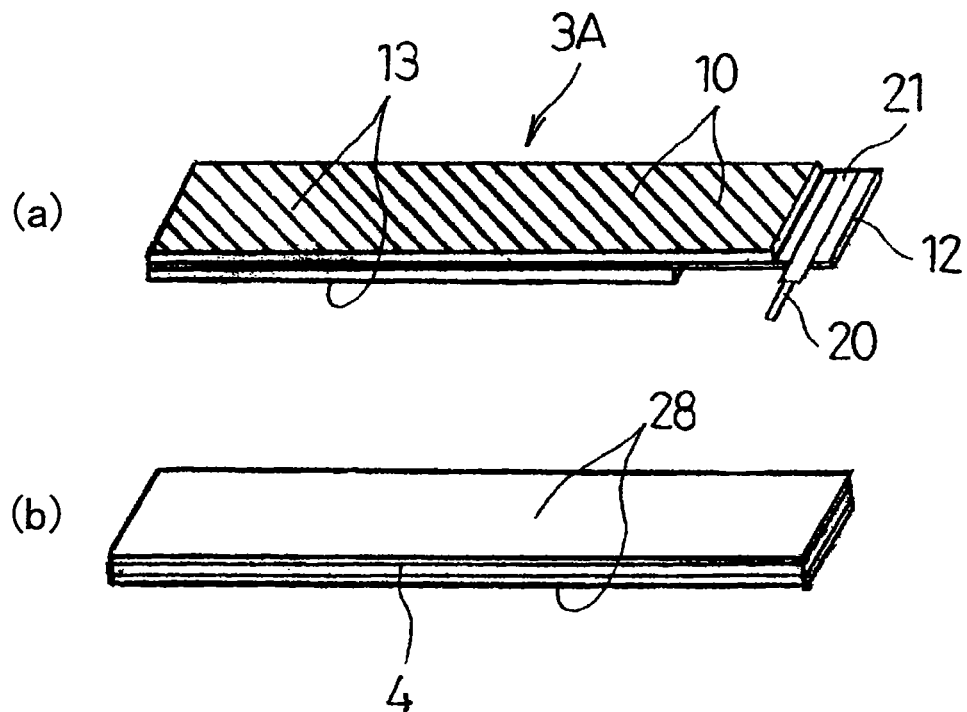
FIGS. 6(a) and 6(b) are perspective views respectively illustrating a negative electrode plate and a separator for a secondary battery according to another embodiment of the present disclosure.

FIGS. 6(a) and 6(b) are perspective views respectively illustrating a negative electrode plate 3A and a separator 4 for a secondary battery according to another embodiment of the present disclosure. In the above-described embodiment, the porous protective film 28 is formed on a surface of the negative electrode active material layer 13 of the negative electrode plate 3, and then the grooves 10 are formed in a surface of the porous protective film 28 and the surface of the negative electrode active material layer 13. However, to improve the electrode injection property and impregnation of an electrolyte into the electrode plate group 1 due to the grooves 10 and thereby achieve high efficiency production, grooves may be formed in either one of the positive electrode plate 2 and the negative electrode plate 3, and therefore, the electrode injection property and impregnation of an electrolyte into the electrode plate group 1 can be improved by forming grooves in either one of the electrodes. In that case, if each groove has the same cross-sectional shape, the same depth D, and the same pitch P as those of the above-described embodiment, the same effects as those of the above-described embodiment can be achieved even though grooves are formed in the positive electrode plate 2. Note that, since an active material layer of the positive electrode plate 2 is relatively harder than an active material layer of the negative electrode plate 3, a large pressure have to be applied if grooves are formed in the positive electrode plate 2 of the lithium secondary battery.

Figure 7:
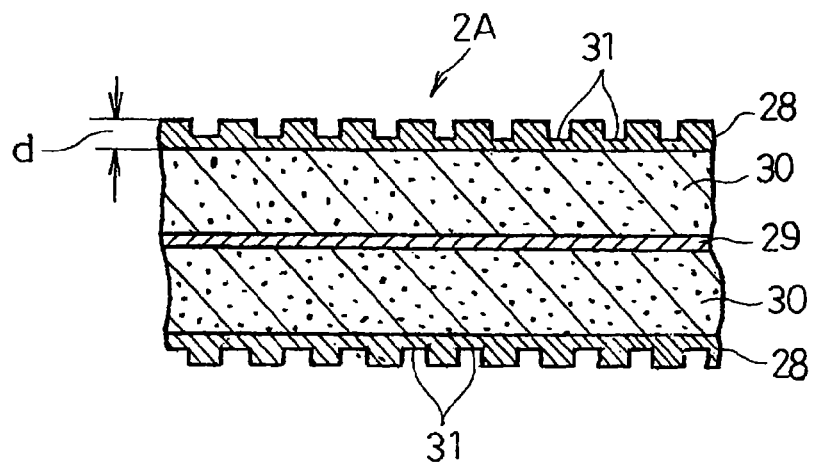
FIG. 7 is a vertical cross-sectional view illustrating a positive electrode plate for a secondary battery according to still another embodiment of the present disclosure.

FIG. 7 is a vertical cross-sectional view illustrating a positive electrode plate 2A in which grooves 31 are formed only in a porous protective film 28. In the positive electrode plate 2A, a positive electrode active material layer 30 is formed on each of both surfaces of a current collector core material 29 (Step (a)), the porous protective film 28 is formed on a surface of each of the positive electrode active material layers 30 (Step (b)), and the grooves 31 are formed only in the porous protective film 28 (Step (c)). In this case, to form the grooves 31 only in the porous protective film 28 without generating cracks in the porous protective film 28, the thickness d of the porous protective film 28 is set to be larger than a depth D of the grooves 31. Therefore, the porous protective film 28 is preferably formed so as to have a larger thickness than that of the above-described embodiment. For example, the thickness d of the porous protective film 28 is preferably 10 μm or more and 100 μm or less.

The positive electrode plate 2A shown in FIG. 7 can be formed according to the method described in the above-described embodiment. In this case, the positive electrode active material layer 30 is harder than a negative electrode active material layer but, since the grooves 31 are formed only in the porous protective film 28, the grooves 31 can be formed without applying a large pressure to the positive electrode active material layer 30.

The above description has been given with referring to the electrode plate group including the positive electrode plate and the negative electrode plate wound with the separator interposed therebetween. However, as the electrode plate group, an electrode plate group in which a positive electrode, a separator, and a negative electrode plate are stacked in this order may be used.

Moreover, in FIG. 7, the positive electrode plate has been described as an example. However, a negative electrode plate may be used. That is, the negative electrode plate may have the following configuration. A negative electrode active material layer is provided on each of both surfaces of a current collector core material of a negative electrode, a porous protective film is provided on a surface of each of the negative electrode active material layers, and grooves are formed only in the porous protective film.

EXAMPLE 1

Hereinafter, examples of the present disclosure will be described.

One hundred parts by weight of artificial graphite as a negative electrode active material, 2.5 parts by weight (1 part by weight in terms of solid content of a binder) of styrene butadiene copolymer rubber particle dispersing element (40 wt % of solid content) as a binder, 1 part by weight of carboxymethylcellulose as a thickener were stirred with an adequate amount of water by a blender, thereby forming a negative electrode mixture paste. The negative electrode mixture paste was applied to a current collector core material 12 of a copper foil having a thickness of 10 μm, and dried to form a negative electrode active material layer 13, and the negative electrode active material layer 13 was compressed by roll pressing so as to have a total thickness of about 200 μm. Next, a small amount of a binder was added to alumina oxide particles having a particle size of about 1.2 μm and then mixed, thereby forming insulation material paste. The insulation material paste was applied to a surface of the negative electrode active material layer 13 to a thickness of about 6 μm using a roller-type intermittent coating system, and dried. Thus, the porous protective film 28 was formed on the surface of the negative electrode active material layer 13. Thereafter, the current collector core material 12 with the negative electrode active material layer 13 and the porous protective film 28 provided thereon was cut by a splitter into strips each having a width of about 60 mm, which is a width of a negative electrode plate 3 of a cylindrical lithium secondary battery with a normal capacity of 2550 mAh, a diameter of 18 mm and a height of 65 mm, thereby forming a negative electrode plate hoop material 11.

Next, the negative electrode plate hoop material 11 was passed through a space between a pair of groove processing rollers, i.e., a upper groove processing roller 22 and a lower groove processing roller 23, of a groove processing machine shown in FIG. 5, thereby forming grooves 10 in the porous protective film 28 and the negative electrode active material layer 13. Note that the current collector core material 12 with the negative electrode active material layer 13 and the porous protective film 28 provided thereon may be cut to be divided into strips according to an electrode plate width after forming the grooves 10. The groove processing machine includes the pair of the upper groove processing roller 22 and the lower groove processing roller 23 each having a roll diameter of, for example 100 mm. In the upper groove processing roller 22 and the lower groove processing roller 23, the groove processing line projections 22a and 23a are formed, respectively. The groove processing line projections 22a and 23a are formed so that each of the groove processing line projections 22a and 23a has an apex angle of 120 degrees and an average height of 25 μm and is tilted at an angle of 45 degrees with respect to a roller axis. The groove processing line projections 22a and 23a are provided with a pitch P of 170 μm in a circumferential direction, and are made of ceramic. The lower groove processing roller 23 and the upper groove processing roller 22 are arranged so that the lower groove processing roller 23 is fixed and the upper groove processing roller 22 is movable in a vertical direction. Also, the groove processing machine is configured so that the upper groove processing roller 22 and the lower groove processing roller 23 are rotated at the same rotation speed due to the gears 24 and 27 being meshed with each other, rotation power is transmitted from a servomotor to the lower groove processing roller 23, and rotation of the lower groove processing roller 23 is transmitted to the upper groove processing roller 22 via the pair of gears 24 and 27 meshed with each other.

The upper groove processing roller 22 which was movable in the vertical direction was pressurized by an air cylinder, and an air pressure of the air cylinder was adjusted to adjust the depth D of grooves 10 to be formed. A pressure to be applied to the upper groove processing roller 22 was adjusted, by adjusting the air pressure of the air cylinder, so that the depth D of the grooves 10 was set to be 8 μm. The grooves 10 were formed in the negative electrode plate hoop material 11 by pressuring the negative electrode plate hoop material 11 by the upper groove processing roller 22 and the lower groove processing roller 23. The depth D of the grooves 10 was measured by a contour measuring device, and then, it was confirmed that the depth D of the grooves 10 formed in respective surfaces of the porous protective film 28 and the negative electrode active material layer 13 provided on each of both surfaces of the negative electrode plate 3 were about 8 μm. Also, using a laser microscope, whether or not cracks were generated in the porous protective film 28 and the negative electrode active material layer 13 was examined, and no crack was found. Moreover, increase in thickness of the negative electrode plate 3 was about 0.5 μm and expansion of the negative electrode plate 3 per cell in the longitudinal direction was about 0.1%.

One hundred parts by weight of lithium cobaltate as a positive electrode active material, 2 parts by weight of acetylene black as a conductive agent, and 2 parts by weight of polyvinylidene fluoride (PVdF) as a binder were stirred with an adequate amount of N-methyl-2-pyrrolidone by a blender, thereby forming a positive electrode mixture paste. The positive electrode mixture paste was applied to a core material of aluminum foil having a thickness of 15 μm, and dried to form a positive electrode active material layer. Thereafter, the positive electrode active material layer was rolled so as to have a total thickness of about 200 μm, thereby obtaining a positive electrode plate hoop material.

Next, after drying the positive electrode plate hoop material and the negative electrode plate hoop material and thereby removing excess moisture, the positive electrode plate hoop material and the negative electrode plate hoop material were wound with a separator 4 of a polyethylene porous film with a thickness of about 30 μm interposed therebetween, thereby forming an electrode plate group of the example. In order to take out each electrode plate group after winding it, the negative electrode plate hoop material 11 was cut along a boundary between each double-coated part 14 and an associated core material exposed part 18 shown in FIG. 2. Note that a current collector lead 20 was attached to the core material exposed part 18 of the negative electrode plate hoop material 11 using a welding portion provided in a winding machine. After the electrode plate group formed in the above-described manner was placed in a battery case, about 5 g of an electrolyte, obtained by dissolving 3 parts by weight of a mixture of $LiPF_6$ and VC (vinylene carbonate) in a mixed solvent of EC (ethylene carbonate), DMC (dimethyl carbonate), and MEC (methylethylcarbonate), was injected, and then the electrolyte injection property was examined.

When evaluation of the electrolyte injection property was conducted, an injection method in which about 5 g of an electrolyte was supplied to the battery case and the air was vacuumed to impregnate the electrolyte was used. Note that the electrolyte may be supplied into the battery case by several injections.

After a predetermined amount of the electrolyte was injected, the battery case was placed in a vacuum booth and vacuuming was performed to exhaust the air in the electrode plate group. Subsequently, an atmosphere was introduced into the vacuum booth, so that the electrolyte was forced to permeate the electrode plate group due to a differential pressure between a pressure in the battery case and a pressure in the atmosphere. The vacuuming was performed under a vacuum of −85 kpa. An injection time for injection of the electrolyte in this process step was measured and used as injection time data for comparison of the electrolyte injection property.

Obtained results of the examination are as follows: the electrolyte injection time was about 23 minutes 10 seconds for the electrode plate group using the negative electrode plate in which the grooves 10 having a depth of about 8 μm were formed in the porous protective film 28, the electrolyte injection time was about 60 minutes 53 seconds for the electrode plate group using the negative electrode plate in which only the porous protective film was provided and no groove was formed. As clearly shown by the results, it is confirmed that by forming grooves in the surface of the porous protective film 28 and the surface of the negative electrode active material layer 13, the electrolyte injection property can be dramatically improved, and thus, the electrolyte injection time can be largely reduced.

In experimental production of test batteries, the weight of the battery before an electrolyte was injected thereto was measured in advance, and the weight of the battery was measured after injection of the electrolyte was completed to confirm that a defined amount of electrolyte was injected. Thereafter, the battery case was sealed to obtain a cylindrical battery having a nominal capacity of 2550 mAh, a nominal voltage of 3.7 V, a battery diameter of 18 mm, and a height of 65 mm for battery test, and then a property test was performed to the battery.

As safety tests, a crash test, a nail test, an external short-circuit test, an overcharge test, and a heat test at 150° C. were performed. In the crash test, nail test and external short-circuit tests, it was confirmed that no heat generation and no expansion occurred in the second battery. In the overcharge test, it was confirmed that no leakage and no heat generation occurred in the secondary battery. Also, in the heat test at 150° C., it was confirmed that no expansion and no heat generation occurred in the secondary battery. It was, therefore, shown that even when grooves were formed in the surfaces of the porous protective film 28 and the negative electrode active material layer 13, a porous protective film of alumina oxide effectively functioned to prevent the occurrence of excessive heat.

Note that as a positive electrode active material, lithium nickel composite oxide represented by a composition formula of $LiNi_8Co_{0.1}Al_{0.05}O_2$ was used. The lithium nickel composite oxide can be formed in the following manner. Sulfuric acid containing Co and Al at a predetermined ratio was added to a $NiSO_4$ aqueous solution to prepare a saturated aqueous solution. Then, while the saturated aqueous solution was stirred, an alkali aqueous solution in which sodium hydroxide was dissolved was slowly dropped into the saturated aqueous solution to neutralize the saturated aqueous solution, and thereby precipitation of ternary nickel hydroxide $Ni_{0.8}Co_{0.15}Al_{0.05}(OH)_2$ was generated by a coprecipitation method. The precipitate was filtered, washed with water, and dried at 80° C.

Then, lithium hydroxide hydrate was added to the precipitate so that the ratio between the sum of respective numbers of atoms of Ni, Co and Al, and the number of atoms of Li was 1:1.03 and heat treatment was performed to the precipitate in an oxygen atmosphere at a temperature of 800° C. for 10 hours, thereby obtaining desired $LiNi_{0.8}Co_{0.15}Al_{0.05}(OH)_2$. It was confirmed by X-ray powder diffraction that obtained lithium nickel composite oxide had a single phase hexagonal crystal structure and Co and Al became a solid solution. Then, pulverization and classification were performed and positive electrode active material powder was obtained.

Five parts by weight of acetylene black as a conductive agent was added to 100 parts by weight of the active material, and then a solution obtained by dissolving polyvinylidene fluoride (PVdF) as a binder in a solvent of N-methylpyrrolidone (NMP) was mixed with the mixture of the active material and acetylene black and was kneaded, so that a coating material in paste form was obtained. Note that the amount of PVdF was adjusted to be 5 parts by weight with respect to 100 parts by weight of the active material. The paste was applied to each of both surfaces of a current collector core material of aluminum foil having a thickness of 15 μm, and dried. Thereafter, the foil with the paste applied was rolled, thereby forming a positive electrode plate hoop material having a thickness of about 200 μm and a width of about 60 mm.

Note that in the above-described embodiment and the above-described example, a cylindrical battery as a secondary battery has been described as an example. However, the present disclosure can be applied to a rectangular battery. In a rectangular battery, unlike a cylindrical battery, the shape of an electrode plate group is flat and the cross-sectional shape of a battery case is rectangular. Moreover, when the rectangular battery is formed, an opening portion of the battery case may be closely sealed with a sealing plate after placing the electrode plate group in the battery case, an electrolyte may be injected through an injection opening of the sealing plate, and then the injection opening may be closely sealed with a lid.

INDUSTRIAL APPLICABILITY

As has been described, according to the present disclosure, a plurality of grooves are formed in an entire surface of an active material layer of at least one of a positive electrode plate and a negative electrode plate to provide spaces from a separator. Thus, an electrolyte is uniformly impregnated into an electrode plate group through the spaces so as to reach even bottom part of the electrode plate group in the step of injecting the electrolyte, and also the electrolyte is impregnated into the other electrode plate of an opposite polarity through the thin separator, so that the electrolyte injection time can be dramatically reduced to achieve the effect of improving productivity. In addition, by forming the porous protective film on at least one of the positive electrode plate and the negative electrode plate, a secondary battery in which an internal short-circuit is suppressed and whose safety can be ensured, and a method for producing the secondary battery can be provided.

The invention claimed is:

1. A method for producing a secondary battery including an electrode plate group in which a positive electrode plate and a negative electrode plate are wound or stacked with a separator interposed therebetween and a battery case in which the electrode plate group and an electrolyte are contained, the method comprising the steps of:
   a) forming a positive electrode active material layer on a surface of a current collector core material of a positive electrode and a negative electrode active material layer on a surface of a current collector core material of a negative electrode;
   b) forming a porous protective film on a surface of at least one of the positive electrode active material layer and the negative electrode active material layer to form a positive electrode plate and a negative electrode plate;
   c) forming, after the step b), a plurality of grooves at least in a surface of the porous protective film;
   d) forming, after the step c), an electrode plate group by winding or stacking the positive electrode plate and the negative electrode plate with a separator interposed therebetween; and
   e) placing and injecting, after the step d), the electrode plate group and the electrolyte in the battery case, and sealing the battery case,
   wherein in the step c), the plurality of grooves are formed simultaneously in the surface of the porous protective film and in a surface of the at least one of the active material layers.

2. The method of claim 1, wherein in the step c), the grooves are formed, using rollers each having projections formed on a circumference surface thereof, so that only the projections of the circumference surface of each of the rollers are in contact with the surface of the porous protective film.

3. The method of claim 1, wherein the porous protective film is formed so as to have a thickness of 2 μm or more and 20 μm or less.

4. The method of claim 1, wherein each of the grooves has a cross-sectional shape in which each of opening top portions and groove bottom corner portions of the groove has an arc shape.

5. The method of claim 1, wherein the grooves are formed so that each of the grooves has a depth of 4 μm or more and 20 μm or less.

6. The method of claim 1, wherein the grooves are formed so that a total volume of the grooves is 0.1% or more and 10% or less of a sum of a volume of the active material layer and a volume of the porous protective film.

7. The method of claim 1, wherein the grooves are formed so that each of the grooves extends from one end of the at least one of the electrodes to the other end thereof in a widthwise direction thereof.

8. The method of claim 1, wherein the grooves are formed so that each of the grooves extends so as to be perpendicular with or tilted from a longitudinal direction of the at least one of the electrode plates.

9. The method of claim 1, wherein the porous protective film contains at least one of silica and alumina.

* * * * *